United States Patent [19]

Hallberg

[11] Patent Number: 5,712,553

[45] Date of Patent: Jan. 27, 1998

[54] BATTERY TRANSPOSITION SYSTEM AND METHOD

[75] Inventor: Bryan Severt Hallberg, Vancouver, Wash.

[73] Assignees: Sharp Microelectronics Technology, Inc., Camas, Wash.; Sharp/Kabushiki Kaisha, Osaka, Japan

[21] Appl. No.: 586,245

[22] Filed: Jan. 11, 1996

[51] Int. Cl.[6] .................. H02J 7/00; H01M 10/44
[52] U.S. Cl. .................. 320/15; 17/13; 17/2
[58] Field of Search .................. 320/15, 17, 18, 320/13, 2, 16, 6, 7

[56] References Cited

U.S. PATENT DOCUMENTS

| | | | |
|---|---|---|---|
| 4,015,420 | 4/1977 | Walker | 368/69 |
| 4,044,293 | 8/1977 | Follmer | 320/15 |
| 4,052,647 | 10/1977 | Thompson | 318/139 |
| 4,101,787 | 7/1978 | Vail | 320/15 X |
| 4,297,590 | 10/1981 | Vail | 307/43 |
| 4,723,079 | 2/1988 | Norton | 307/66 |
| 4,816,736 | 3/1989 | Douugherty et al. | 320/17 |
| 5,028,858 | 7/1991 | Schnizler et al. | 320/2 |
| 5,270,946 | 12/1993 | Shibasaki et al. | 364/492 |
| 5,389,825 | 2/1995 | Ishikawa et al. | 307/10.1 |
| 5,418,402 | 5/1995 | Fujiwara | 307/10.1 |
| 5,436,513 | 7/1995 | Kaye et al. | 307/71 |
| 5,477,123 | 12/1995 | Allen et al. | 320/2 |

*Primary Examiner*—Peter S. Wong
*Assistant Examiner*—K. Shin
*Attorney, Agent, or Firm*—Gerald W. Maliszewski; David C. Ripma

[57] ABSTRACT

A battery power supply transposition circuit has been provided to control the use of batteries in a power source supplying multiple voltages from multiple batteries that share a least one common battery. The transposition circuit includes switches to provide selective interconnections between the battery terminals which allow the order of the series connected batteries to be changed. A battery interconnection controller is also included to control interconnections between batteries, and so allow alternate batteries to be used as the at least one common battery. Changing the selection of the at least one common battery provides a means for minimizing differences in the rate at which the batteries are depleted.

20 Claims, 4 Drawing Sheets

BATTERY TRANSPOSITION SYSTEM AND METHOD

BACKGROUND AND SUMMARY OF THE INVENTION

This invention relates generally to a power supply comprising a plurality of batteries to provide multiple voltages, and more particularly to a system of selectively changing the battery interconnection in the power supply to equalize battery usage and to promote uniform battery depletion.

Many electrical and motorized devices, and almost all portable electrical devices, use batteries to supply power. Portable electronic devices sometimes require multiple voltages for operation. Some of these devices accept a first voltage from a single voltage power supply and use internal voltage regulators, or other voltage conversion circuitry, to produce different voltages as required. One method of supplying the multiple voltages is to arrange several batteries into series connections. In this manner, a power supply can provide a voltage as high as the series combination of all the batteries, or a voltage as low as a single battery voltage. Likewise, intermediate voltages can be provided that are a serious combination of one, two, three or more batteries.

In a dual voltage power supply wherein a higher voltage is supplied by two or more batteries connected in series, and a lower voltage is supplied by just one of the batteries, the later battery is depleted faster. That is, a battery common to more than one power source is depleted faster than a battery used for just one power source. For example, two batteries, A and B, both one and a half volts, are connected in series to supply three volts to a first device, and battery B selectively supplies one and a half volts to a second device. Since battery B is common to both the three volt and one and a half volt supplies, it sources more current than battery A and is depleted before battery A.

Multiple batteries connected in series to provide a voltage that is a combination of the batteries, will generally only operate as well as the weakest battery. If one battery in the power supply is depleted faster than the other batteries, then the entire power supply has a shorter useful life. When it is determined that a battery power supply has exceeded it's useful life, most operators will replace all the batteries. Individual batteries can be tested so that only the bad battery is replaced, but it is inconvenient. To insure the best possible performance of their electrical devices, many manufacturers suggest replacing all the batteries when a battery power supply fails. Replacing all the batteries is convenient for a user who has access to new batteries, but it does not promote efficient use of batteries, nor it is ecologically sound. Further, users do not always have access to enough fresh batteries to replace all the batteries when battery power supplies begin to fail.

Systems for switching battery connections between series and parallel are known in the prior art. For example, Thompson, U.S. Pat. No. 4,052,647, discloses an electric vehicle powered from batteries that are switched to provide high and low voltages. Ishikawa, et al., U.S. Pat. No. 5,389,825, discloses an electrical vehicle and a switch system of powering the vehicle with a battery and generator. Fujiwara, U.S. Pat. No. 5,418,402, also discloses a series/parallel battery changeover apparatus for an electrical vehicle.

These prior art systems provide a means for supplying a variety of voltages to an electrical device having highly dynamic power requirements. These electric vehicle battery connection systems do not, however, address the problem of equalizing the use of the batteries in a power supply that simultaneously provides at least two uniform, but different, voltage outputs. That is, prior art devices disclose no method of switching or transposing battery connections for the purpose of ensuring that the batteries are used efficiently or depleted uniformly.

It would be advantageous of the loading on a plurality of series connected batteries, in a power supply providing at least two voltages power to could be varied without the necessity of physically opening the supply to rearrange the batteries so that the batteries ore not depleted at unequal rates.

It would also be advantageous if the order of series connected batteries, in a power supply providing multiple voltages, were rotated in accordance with a scheme to promote equal battery usage:

It would be advantageous of a battery power supply providing multiple voltages could be depleted as efficiently as a power supply using a plurality of series connected batteries providing a single voltage. In this manner, the building of electrical devices without inefficient and space consuming voltage regulators and voltage down-conversion circuitry is encouraged.

Accordingly, a battery power supply including a first group of at least two series connected batteries for supplying a first voltage has been provided. The power supply also providing a second voltage supplied from a subgroup of the first group, including at least one battery, the second voltage being less than the first voltage, and the power supply comprising a plurality of battery interconnections for selectively supplying the second voltage from different subgroups of the first voltage, and a battery interconnection controller operatively connected to said battery interconnections for varying the subgroup from which the second voltage is derived, whereby the one or more batteries supplying the second voltage are changed to minimize differences in the depletion of the batteries.

In a preferred form of the invention; the battery supply comprises at least two batteries, battery A and battery B. The first voltage is supplied from the series connection of batteries A and B. The interconnection controller connects the negative terminal of battery A to the positive terminal of battery B so that battery B supplies the second voltage. Alternately, the interconnection controller transposes the order of batteries so that battery B's negative terminal is connected to the positive terminal of battery A so that batteries A and B supply the first voltage and battery A supplies the second voltage.

In another form of the present invention the interconnection of two batteries is effected with at least eight switches which provide the necessary interconnections for the first (higher) voltage from batteries A and B, and for selecting the second (lower) voltage from either battery A or battery B. In yet another form of the invention the switches are transistors.

The present invention also provides a method for supplying at least two different voltages from a power supply having a plurality of batteries, including a first voltage from substantially all the batteries. The method comprises the steps of providing at least a second voltage from at least one battery, the second voltage being equal to a proportional fraction of the first voltage, and selectively providing the second voltage from at least one other battery, different from the first battery, whereby the batteries are managed to augment equal usage.

In a preferred method of the present invention the second voltage is supplied from at least a battery subgroup A and battery subgroup B. The second terminal of subgroup A is connected to the first terminal of subgroup B so that the combination of subgroups A and B provide the first voltage and subgroup B provides the second voltage. Alternately, the batteries are transposed so that the second terminal of subgroup B is connected to the first terminal of subgroup A so that subgroups A and B still provide the first voltage while subgroup A provides the second voltage.

In another embodiment of the method of the present invention battery subgroups are connected to each other, and to the voltage conductors supplying voltage to an external device, with at least eight switches which provide the necessary interconnections for the first voltage from batteries A and B, and for selecting the second voltage from either battery A or battery B.

DETAILED DESCRIPTION OF THE PREFERRED EMBODIMENT

Figure 1:
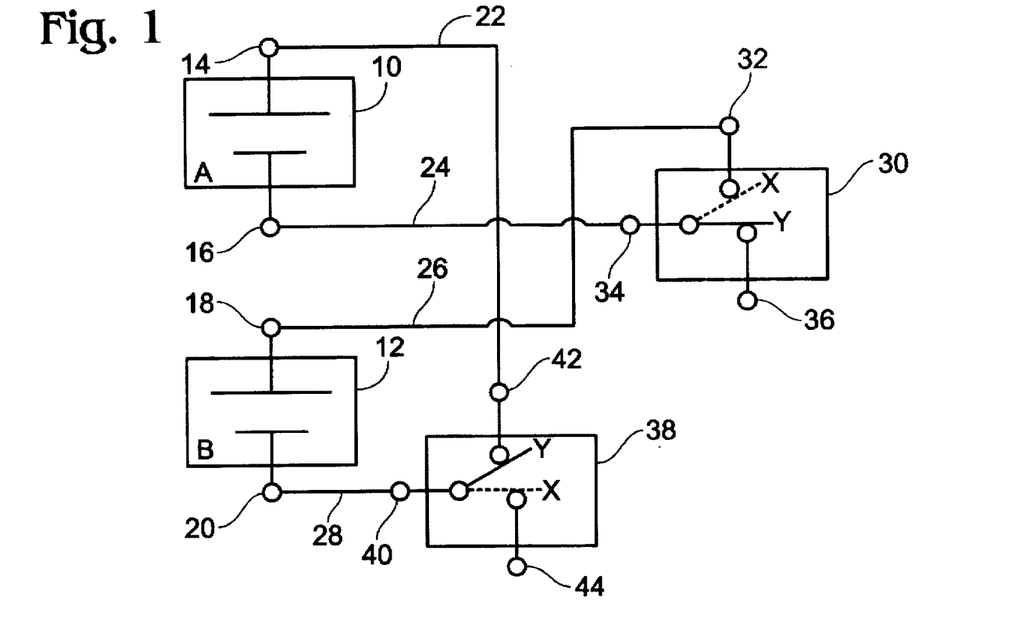
FIG. 1 is a schematic diagram of the battery transposition system in accordance with the present invention.

FIG. 1 is a schematic diagram of a battery transposition system in accordance with the present invention. FIG. 1 shows a plurality of battery interconnections represented schematically by conductive lines and switches serving as battery interconnection controllers. A plurality of batteries are combined to provide a first voltage from substantially all the batteries. Specifically, a first group of batteries is composed of a battery A 10 and a battery B 12 to provide a first voltage. Battery A 10 and battery B 12 are alternate subgroups of the first group, either of which is used to provide a second voltage which is a proportional fraction less than the first voltage. Battery A 10 has a first terminal 14 and a second terminal 16. Likewise, battery B 12 has a first terminal 18 and a second terminal 20. Battery A 10 first terminal 14 is operatively connected to a line 22 and battery A 10 second terminal 16 is operatively connected to a line 24. Likewise, battery B 12 first terminal 18 is operatively connected to a line 26 and battery B 12 second terminal 20 is operatively connected to a line 28.

Line 24 and line 26 are operatively connected to a first switch 30. First switch 30 has a first terminal 32 operatively connected to line 26, a second terminal 34 operatively connected to line 24, and a third terminal 36 that is open, or operatively disconnected from all nodes of interest. First switch 30 operatively connects line 24 to line 26 when the switch is in the X position, thereby operatively connecting second terminal 16 of battery A 10 to first terminal 18 of battery B 12. In first switch 30, Y position, line 24 is operatively connected to open third terminal 36, so that second terminal 16 of battery A 10 is operatively disconnected from first terminal 18 of battery B 12.

Line 22 and line 28, shown in FIG. 1, are operatively connected to a second switch 38. Second switch 38 has a first terminal 40 connected to line 28, a second terminal 42 connected to line 22, and a third terminal 44 that is open. Second switch 38 operatively connects line 28 to open third terminal 44 when the switch is in the X position. Second switch 38 operatively connects line 28 to line 22 when the switch is in the Y position so that first terminal 14 of battery A 10 is operatively connected to second terminal 20 of battery B 12.

First switch 30 and second switch 38, used conjunctively, provide a means for selecting the battery, or voltage subgroup, used to supply the second voltage. That is, the switches are used so that they are both simultaneously in either the X or Y switch positions. In FIG. 1 the switches are shown, with the use of a solid line inside the switches, in their Y positions. The dashed line shows the switches configured in the X positions. When first switch 30 and second switch 38 are in their respective X positions, second terminal 16 of battery A 10 is operatively connected to first terminal 18 of battery B 12. A first voltage is provided between first terminal 14 of battery A 10 and second terminal 20 of battery B 12 that is the series combination of the batteries. A second voltage is provided across first terminal 18 of battery B 12 and second terminal 20 of battery B 12. In this manner, battery B 12 provides current for both the first and second voltages.

When first switch 30 and second switch 38 are in their respective Y positions, first terminal 14 of battery A 10 is operatively connected to second terminal 20 of battery B 12. A first voltage is provided between first terminal 18 of battery B 12 and second terminal 16 of battery A 10 that is a series combination of the batteries. A second voltage is provided across first terminal 14 of battery A 10 and second terminal 16 of battery A 10. In this manner, battery A 10 supplies current for both the first and second voltages.

Figure 2:
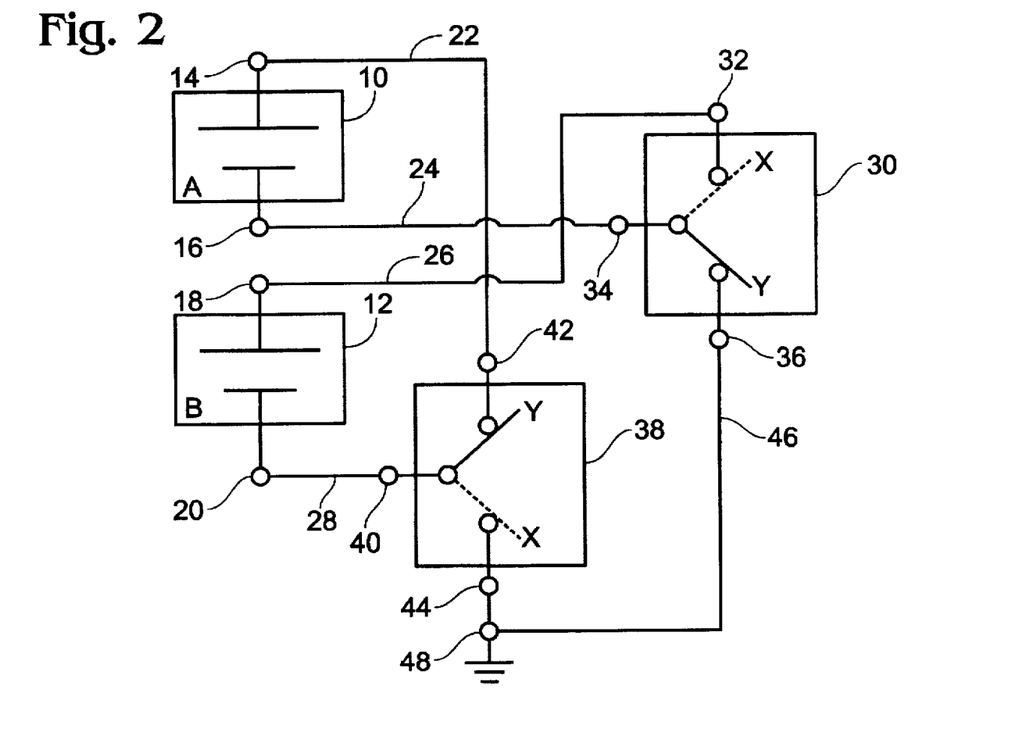
FIG. 2 is an alternate embodiment of the battery transposition system of FIG. 1 including battery interconnections to provide a ground reference.

FIG. 2 is an alternate embodiment of the battery interconnection controller of FIG. 1. Battery interconnections represented by conductive lines provide a Found, or reference voltage, for the power supply. The illustration of a ground is provided to more clearly describe the first and second voltages, and to provide a voltage reference which allows a clearer explanation of the electrical interface between the power supply and an electrical device, not shown, which accepts power from the power supply.

As in FIG. 1, when in switch position X, first switch 30 operatively connects line 24 with line 26 so that second terminal 16 of battery A 10 is operatively connected to first terminal 18 of a battery B 12. In switch position Y, first switch 30 operatively connects line 24 to a line 46 so that second terminal 16 of battery A 10 is operatively connected to a ground, or reference voltage, 48.

In position X of second switch 38, line 28 is operatively connected to line 46 so that second terminal 20 of battery B 12 is operatively connected to ground 48. In position Y, second switch 38 operatively connects line 22 to line 28 so that second terminal 20 of battery B 12 is operatively connected to first terminal 14 of battery A 10.

As in FIG. 1, switches 30 and 38, used conjunctively, provide selective control of the battery used to provide the second voltage. When first switch 30 and second switch 38 are in their X positions, battery A 10 is operatively connected to battery B 12 so that second terminal 16 of battery A 10 is operatively connected to first terminal 18 of battery B 12. In this manner, a first voltage is provided by a series connection of the batteries between first terminal 14 of battery A 10 and second terminal 20 of battery B 12, which is operatively connected to ground 48. A second voltage is provided between first terminal 18 of battery B 12 and second terminal 20 of battery B 12, which is operatively connected to ground 48. When first switch 30 and second switch 38 are in their Y positions, then first terminal 14 of battery A 10 is connected to second terminal 20 of battery B 12 so that a first voltage is provided by a series connection of the batteries between first terminal 18 of battery B 12 and second terminal 16 of battery A 10, which is operatively connected to ground 48. A second voltage is provided between first terminal 14 of battery A 10 and second terminal 16 of battery A 10, which is operatively connected to ground 48.

Electrical devices, not shown, that interface with the power supply are constantly supplied a first voltage and a ground reference. The first voltage is defined as the voltage potential across a group of series connected batteries to a reference ground, such as the voltage across the series connection of battery A 10 and battery B 12 to reference voltage 48. The first voltage remains constant whether the switches in their X or Y positions. That is, the first voltage remains constant regardless of the series order of batteries. A second voltage and reference ground is also constantly supplied to an interfacing electrical device, and is defined as the voltage between a battery's, or subgroup's, first and second terminals when one of those terminals is operatively connected to reference voltage 48. In switch positions X the second voltage is provided by battery B 12, and in switch positions Y the second voltage is provided by battery A 10.

Figure 3:
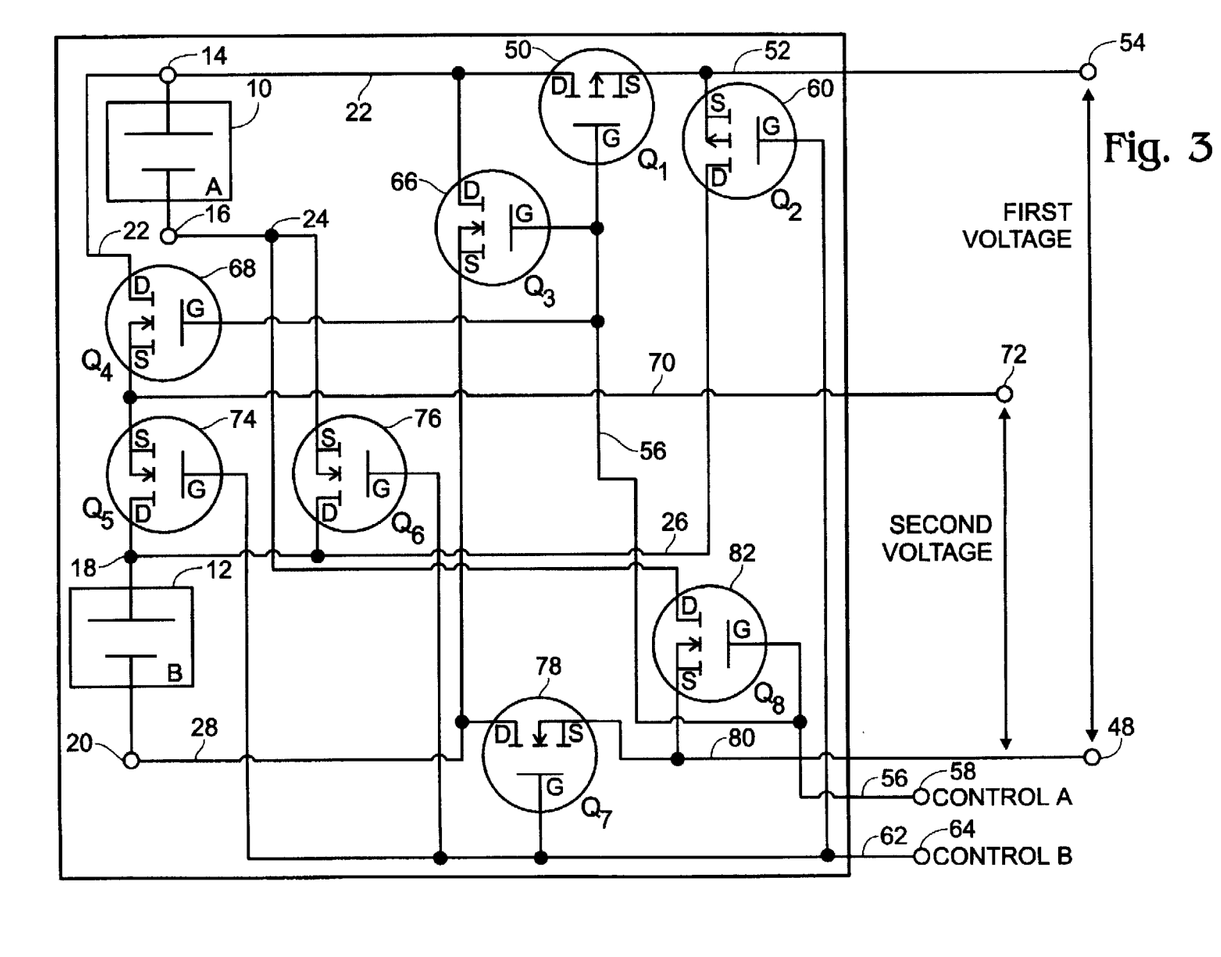
FIG. 3 is a schematic drawing of the battery transposition system of FIG. 1 with eight transistors and two control signals.

FIG. 3 is a schematic drawing of the battery transposition system of FIG. 1 with eight transistors and two control signals. The eight transistors are used as switches in the battery interconnection controller, and along with electrical connections represented by conductive lines, transpose the battery order in response to the control signals. FIG. 3 illustrates an embodiment of the present invention suitable for applications requiring a small package size.

As in FIGS. 1 and 2, first voltage subgroup, or battery A, 10 has first terminal 14 operatively connected to line 22 and second terminal 16 operatively connected to line 24. A second voltage subgroup, or battery B, 12 has first terminal 18 operatively connected to a line 26 and a second terminal 20 operatively connected to line 28. A first MOSFET transistor, Q1, 50 is provided having a drain and source to selectively conduct, and a gate to control the resistance between the drain and source, and representative of the other transistors described below. The drain of first transistor 50, marked "D", is operatively connected to line 22 and the source, marked "S", is operatively connected to a line 52 so that first terminal 14 of battery A 10 is selectively connected to a first conductor of the first, or higher voltage, 54. The gate of first transistor 50, marked "G", is operatively connected to a line 56 to receive a gate control signal, Control A, 58.

The drain of a second transistor, Q2, 60 is operatively connected to line 26 while the source is operatively connected to line 52 so that first terminal 18 of battery B 12 is selectively connected to first voltage first conductor 54. The gate of second transistor 60 is operatively connected to a line 62 to receive a gate control signal, Control B, 64. The drain of a third transistor, Q3, 66 is operatively connected to line 22 and the source operatively connected to line 28 so that first terminal 14 of battery A 10 is selectively connected to second terminal 20 of battery B 12. The gate of third transistor 66 is operatively connected to line 56. The drain of a fourth transistor, Q4, 68 is operatively connected to line 22 and the source is operatively connected to a line 70 so that first terminal 14 of battery A 10 is selectively connected to a first conductor of the second, or lower voltage, 72. The gate of fourth transistor 68 is operatively connected to line 56.

The drain of a fifth transistor, Q5, 74 is operatively connected to line 26 and the source is operatively connected to line 70 so that first terminal 18 of battery B 12 is selectively connected to second voltage first conductor 72. The gate of fifth transistor 74 is operatively connected to line 62. The drain of a sixth transistor, Q6, 76 is operatively connected to line 26 and the source is operatively connected to line 24 so that first terminal 18 of battery B 12 is selectively connected to second terminal 16 of battery A 10. The gate of sixth transistor 76 is operatively connected to line 62. The drain of a seventh transistor, Q7, 78 is operatively connected to line 28 and the source is operatively connected to a line 80 so that second terminal 20 of battery B 12 is selectively connected to the second conductor of the first and second voltages, also called the second conductor of the higher and lower voltages, and also called the reference voltage, or ground, 48. The gate of seventh transistor 78 is operatively connected to line 62. The drain of an eighth transistor, Q8, 82 is operatively connected to line 24 and the source is operatively connected to a line 80 so that second terminal 16 of battery A 10 is selectively connected to the second conductor of the first and second voltages, also called the reference voltage, or ground, 48. The gate of eighth transistor 82 is operatively connected to line 56.

Control A 58 is operatively connected to the gates of first transistor 50, third transistor 66, fourth transistor 68, and eighth transistor 82 to selectively turn the transistors on and off, thus enabling transistors Q1, Q3, Q4, and Q8 to perform as switches. Control B 64 is operatively connected to the gates of second transistor 60, fifth transistor 74, sixth transistor 76, and seventh transistor 78 to selectively turn the transistors on and off, enabling transistors Q2, Q5, Q6, and Q7 to perform as switches.

First transistor 50 and second transistor 60 are depicted, in FIG. 3, as p channel enhancement mode MOSFET transistors, with the arrow of the source pointed away from the gate. Third transistor 66, fourth transistor 68, fifth transistor 74, sixth transistor 76, seventh transistor 78, and eighth transistor 82 are all n channel enhancement mode MOSFETs. As p channel enhancement mode devices, first transistor 50 and second transistor 60 will have a low resistance (turn on) between the drain and source when the voltage at the gate is lower than the voltage on the source, as is well known in the art. These p channel enhancement mode devices have a high resistance between the drain and source (turn off) when the gate voltage is equal to or higher than the voltage at the source. Likewise, as n channel enhancement mode devices, the remaining transistors turn on when the gate voltage is greater than the voltage on the source, and turn off when the gate voltage is equal to or less than the voltage at the source.

To enable the transistors to operate as switches so that battery B 12 provides the second voltage, Control A 58 is at a voltage level substantially the .same as the reference voltage or ground voltage 48, while Control B 64 is at a voltage level substantially the same as first voltage first conductor 54. The ground voltage level provided by Control A 58 to the gate of first transistor 50 is less than the voltage at the source causing this p channel device to be turned on. Since the gate voltage is less than or equal to the voltage at their respective sources, third transistor 66, fourth transistor 68, and eighth transistor 82, all n channel devices, are turned off. As a result, first terminal 14 of battery A 10 is operatively connected to first voltage first conductor 54 by first transistor 50. Also, first terminal 14 of battery A 10 is operatively disconnected from second terminal 20 of battery B 12 by third transistor 66, first terminal 14 of battery A 10 is operatively disconnected from second voltage first conductor 72 by fourth transistor 68, and second terminal 16 of battery A 10 is operatively disconnected from ground 48 by eighth transistor 82.

When battery B 12 provides the second voltage, then simultaneous to Control A 58 being at the ground voltage, Control B 64 provides a voltage substantially equal to first voltage first conductor 54, or the first voltage. The first voltage is the voltage potential between first voltage first conductor, or first higher voltage conductor, 54 and first voltage second conductor, or the higher voltage second conductor 48. The Control B 64 signal is applied to the gates of second transistor 60, fifth transistor 74, sixth transistor 76, and seventh transistor 78 through line 62. Since the gate voltage approximately equals the source voltage of second transistor 60 (a p channel device), it is turned off, operatively disconnecting first voltage first conductor 54 from first terminal 18 of battery B 12. Since the gate voltage exceeds the source voltages of fifth transistor 74, sixth transistor 76, and seventh transistor 78, all n channel devices, they are turned on. Fifth transistor 74 operatively connects first terminal 18 of battery B 12 to second voltage first conductor 72 to provide the second voltage. The second voltage is the voltage potential between second, or lower voltage first conductor 72, and second, or lower, voltage second conductor 48. Sixth transistor 76 operatively connects second terminal 16 of battery A 10 to first terminal 18 of battery B 12. Seventh transistor 78 operatively connects second terminal 20 of battery B 12 to the reference voltage or ground level 48. That is, the seventh transistor 78 operatively connects second terminal 20 of battery B 12 to first voltage second conductor and second voltage second conductor 48.

When battery A 10 supplies the second voltage then the control signal on line 56, Control A 58, is substantially the same voltage as the first voltage, and the control signal on line 62, Control B 64, is substantially at ground. As explained above, the control signal on line 56 turns off first transistor 50 and turns on third transistor 66, fourth transistor 68, and eighth transistor 82. Therefore, first terminal 14 of battery A 10 is operatively disconnected from first voltage first conductor 54 by first transistor 50. Third transistor 66 operatively connects first terminal 14 of battery A 10 to second terminal 20 of battery B 12. Fourth transistor 68 operatively connects first terminal 14 of battery A 10 to second voltage first conductor 72. Eighth transistor 82 operatively connects second terminal 16 of battery A 10 to the reference voltage or ground 48.

When battery A 10 provides the second voltage, then simultaneously to the control signal on line 56 being at the first voltage level, the control signal on line 62 is substantially at ground causing second transistor 60 to turn on while turning off fifth transistor 74, sixth transistor 76, and seventh transistor 78. Therefore, second transistor 60 operatively connects first terminal 18 of battery B 12 to first voltage first conductor 54. Fifth transistor 74 operatively disconnects first terminal 18 of battery B 12 from second voltage first conductor 72. Sixth transistor 76 operatively disconnects second terminal 16 of battery A 10 from first terminal 18 of battery B 12. Seventh transistor 78 operatively disconnects second terminal 20 of battery B 12 from the reference voltage or ground 48.

Therefore, by selecting Control A 58 voltage on line 56 to be at ground (low) and Control B 64 voltage on line 52 to be at the first voltage (high), battery A 10 and battery B. 12 are connected in series to supply a first voltage, and so that battery B 12 supplies the second voltage. When Control A 58 voltage on line 56 is high and Control B 64 voltage on line 62 is low, then battery A 10 and battery B 12 are connected in series to provide a first voltage, and so that battery A 10 supplies the second voltage.

Figure 4:
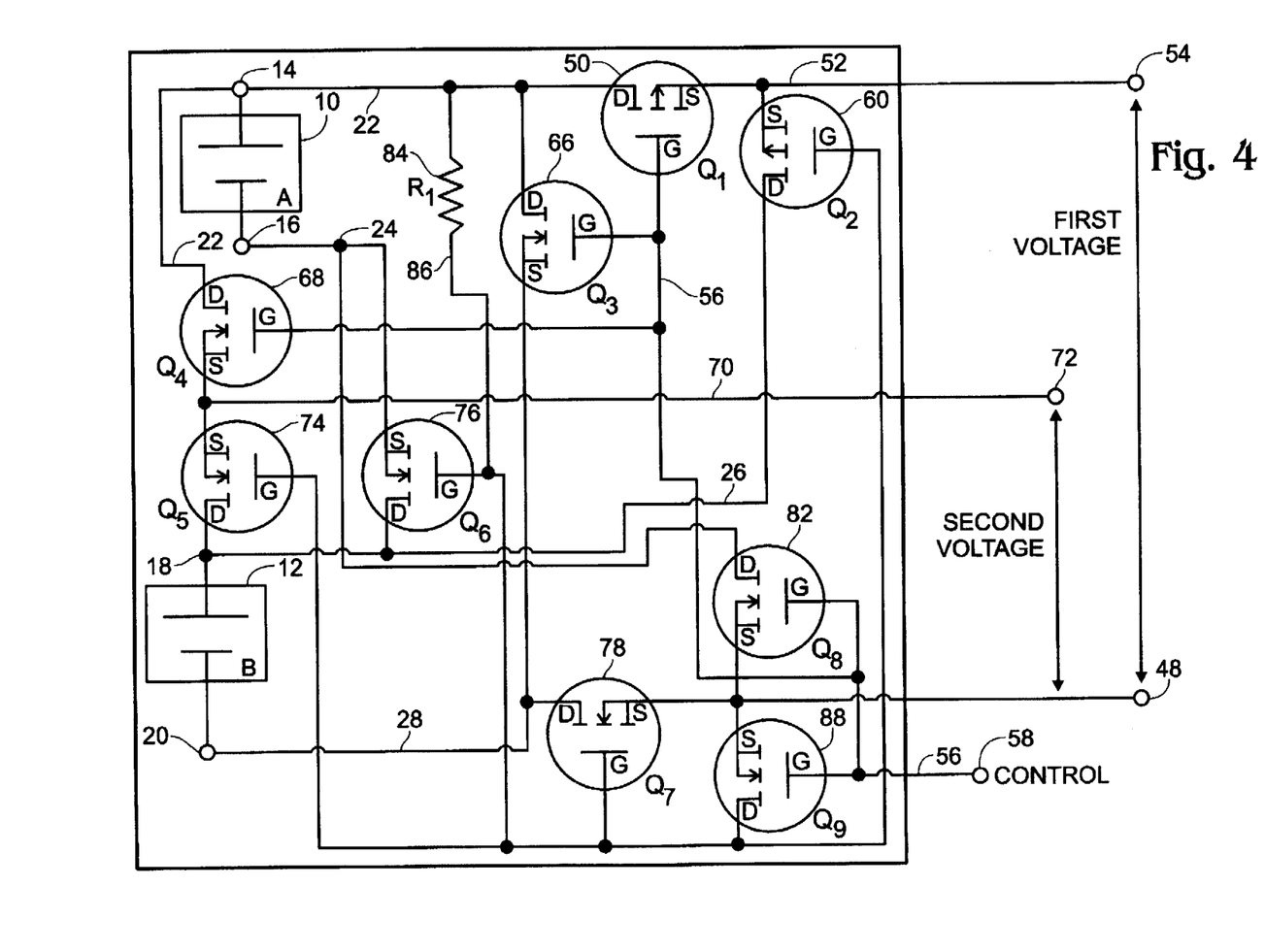
FIG. 4 is the schematic drawing of the battery transposition system of FIG. 1 with nine transistors and a single control signal.

FIG. 4 is the schematic drawing of the battery transposition system of FIG. 1 with nine transistors and a single control signal. An additional transistor and resistor allow the battery interconnection controller to control which battery supplies the second voltage with just a single control signal. A first resistor 84 operatively connects first terminal 14 of battery A 10 to the gates of second transistor 60, fifth transistor 74, sixth transistor 76, and seventh transistor 78 with a line 86 to replace the Control B 64 signal and line 62 of FIG. 3.

A ninth transistor 88 selectively connects the gates of second transistor 60, fifth transistor 74, sixth transistor 76, and seventh transistor 78 to reference voltage, or ground, 48. When battery B 12 supplies the second voltage, Control A 58 voltage on line 56 is at substantially the ground voltage. As explained above in FIG. 3, first transistor 50 is on, while third transistor 66, fourth transistor 68, and eighth transistor 82 are all off when Control A 58 voltage is at ground. In addition, ninth transistor 88 is in the off state since it is an n channel enhancement mode device and the voltage at the gate is equal to the voltage at the source. Thus, first terminal 14 of battery A 10 is operatively connected to first voltage first conductor 54 by first transistor 50. First terminal 14 of battery A 10 is operatively disconnected from second terminal 20 of battery B 12 by third transistor 66. First terminal 14 of battery A 10 is operatively disconnected from second voltage first conductor 72 by fourth transistor 68. Second terminal 16 of battery A 10 is operatively disconnected from the common reference voltage, or ground, 48 by eighth transistor 82. In addition, the gate voltage on second transistor 60, fifth transistor 74, sixth transistor 76, and seventh transistor 78 are operatively disconnected from ground by ninth transistor 88.

Since MOSFET gates draw little current, there is little voltage drop across first resistor 84 and the voltage on line 86 is substantially the same as the voltage at first terminal 14 of battery A 10. Therefore, the gates of second transistor 60, fifth transistor 74, sixth transistor 76, and seventh transistor 78 are all substantially at the voltage level of first terminal 14 of battery A 10 when operatively disconnected from ground 48 by ninth transistor 88. As explained in the description of FIG. 3 above, voltages substantially of the same level as the first voltage (high) turn off second transistor 60 while turning on fifth transistor 74, sixth transistor 76, and seventh transistor 78. In this manner, first voltage first conductor 54 is operatively disconnected from first terminal 18 of battery B 12 by second transistor 60. Second voltage first conductor 72 is operatively connected to first terminal 18 of battery B 12 by fifth transistor 74. Second terminal 16 of battery A 10 is operatively connected to first terminal 18 of battery B 12 by sixth transistor 76. Second terminal 20 of battery B 12 is operatively connected to the common reference voltage, or ground, 48 by seventh transistor 78.

When battery A 10 is to supply the second voltage, Control A 58 voltage on line 56 is a high voltage signal substantially at the level of the first voltage first conductor 54. A high voltage on the gate of first transistor 50 turns the transistor off, operatively disconnecting first terminal 14 of battery A 10 from first voltage first conductor 54. A high voltage on the gates of third transistor 66, fourth transistor 68, eighth transistor 82, and ninth transistor 88 turn all these transistors on. Therefore, first terminal 14 of battery A 10 is operatively connected to second terminal 20 of battery B 12 with third transistor 66. First terminal 14 of battery A 10 is operatively connected to second voltage first conductor 72 with fourth transistor 68. Second terminal 16 of battery A 10 is operatively connected to ground 48 with eighth transistor 82. The gates of second transistor 60, fifth transistor 74, sixth transistor 76, and seventh transistor 78 are all operatively connected to ground 48 through ninth transistor 88.

As described above, second transistor 60 is turned on when the gate voltage is substantially at ground (low). Fifth transistor 74, sixth transistor 76, and seventh transistor 78 are all turned off when the gate voltage is low. Therefore, first terminal 18 of battery B 12 is operatively connected to first voltage first conductor 54 with second transistor 60. Second voltage first conductor 72 is operatively disconnected from first terminal 18 of battery B 12 with fifth transistor 74. Second terminal 16 of battery A 10 is operatively disconnected from first terminal 18 of battery B 12 with sixth transistor 76. Finally, second terminal 20 of battery B 12 is operatively disconnected from ground 48 with seventh transistor 78.

Therefore, when Control A 58 voltage is high, battery A 10 and battery B 12 are operatively connected in series to provide the first voltage, and so that battery A 10 supplies the second voltage. When Control A 58 voltage is low, battery B 12 and battery A 10 are operatively connected in series to provide the first voltage, and so that battery B 12 supplies the second voltage.

Table 1 is presented, below, as a summary of the on/off states of the transistors presented in FIGS. 3 and 4 relative to the battery which has been selected to provide the second voltage.

TABLE 1

| Transistor | Battery B/2nd voltage | Battery A/2nd voltage |
|---|---|---|
| Q1, 50 | on | off |
| Q2, 60 | off | on |
| Q3, 66 | off | on |
| Q4, 68 | off | on |
| Q5, 74 | on | off |
| Q6, 76 | on | off |
| Q7, 78 | on | off |
| Q8, 82 | off | on |
| Q9, 88 (FIG. 4 only) | off | on |

Figure 5:
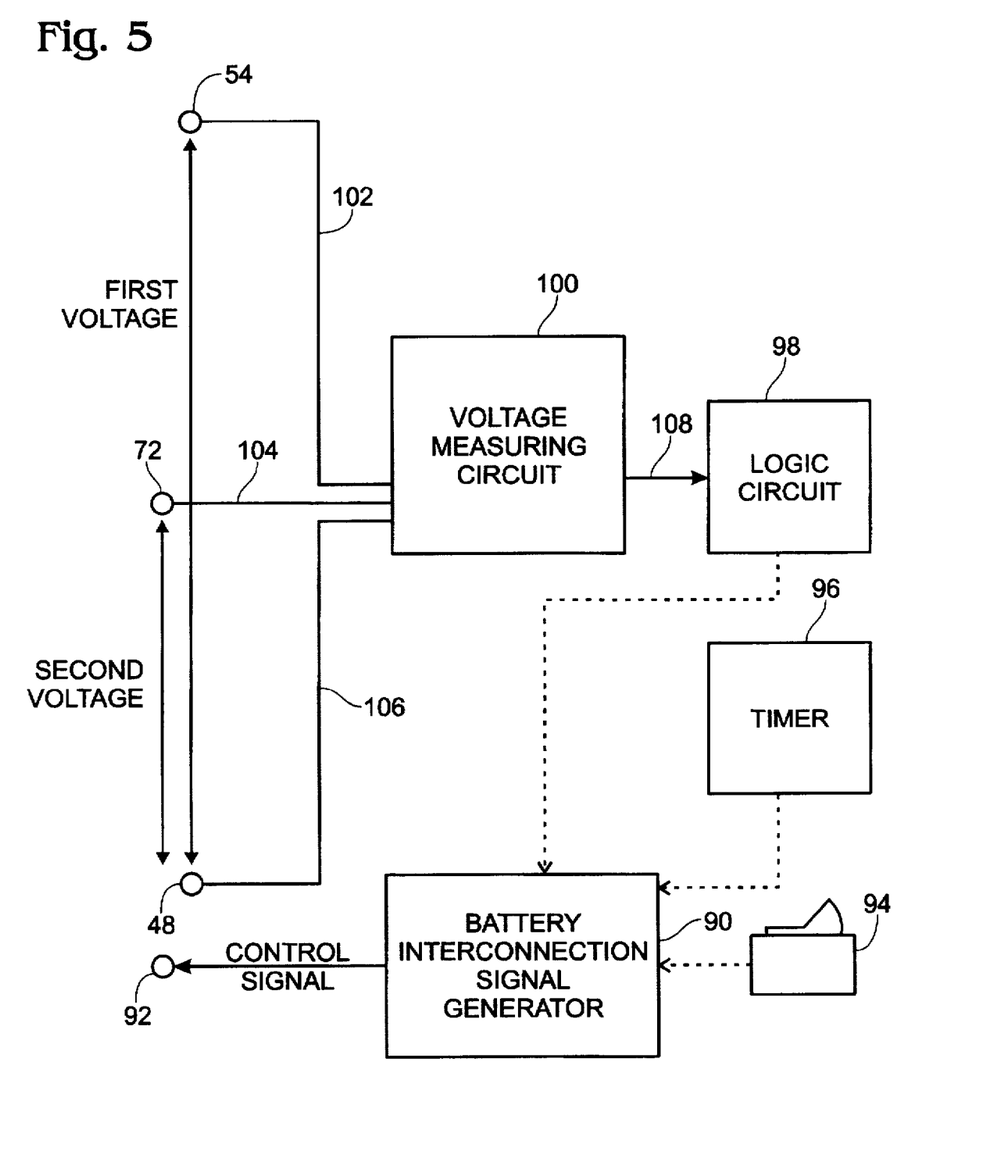
FIG. 5 is a block diagram of the battery transposition system of FIG. 1 including additional battery interconnection controller elements to provide alternate forms of battery selection.

FIG. 5 is a block diagram of the battery transposition system of FIG. 1 including additional battery interconnection controller elements to provide alternate forms of battery selection. A battery interconnection signal generator 90 creates a control signal 92 to operate the battery interconnection controller. In one form of the invention signal generator 90 supplies control signal 92 in the form of Control A 58 and Control B 64 to operate the transistors of FIG. 3. In another form, signal generator 90 provides control signal 92 in the form of Control A 58 to operate the transistors of FIG. 4. Alternately, signal generator 90 provides a control signal 92 in the form of electrical signals to operate switches 30 and 38 of FIGS. 1 and 2 when the switches are electrically controlled. Alternately, signal generator 90 provides control signal 92 in the form of a mechanical drive needed to operate switches 30 and 38 of FIGS. 1 and 2 when the switches are mechanically controlled.

The selection of the batteries, or subgroups, supplying the second voltage is achieved through many alternate forms, including the ones mentioned below. One method of selecting the battery to provide the second voltage, and transposing the battery order is with a user manipulable switch. A switch 94 is presented in FIG. 5 to represent a means for a user operator of the battery power supply to communicate a decision to change the battery order. Switch 94 is operatively connected to signal generator 90. In the first switch position signal generator 90 is commanded to provide control signal 92 so that battery A 10 and battery B 12, of FIGS. 1–4, are connected in series to provide a first voltage, and also so that battery B 12 provides the second voltage. In the second switch position signal generator 90 is commanded to provide control signal 92 so that battery A 10 and battery B 12 provide the first voltage, and so that battery A 10 provides the second voltage. Switch 94 may take many forms including a multi-pole switch, momentary contact switch, and keypad entry.

Another form of battery selection involves a timer 96 operatively connected to signal generator 90. Timer 96 commands signal generator 90 by a timing scheme. A typical timing scheme averages the or amount of time a battery is used to provide the second voltage so that battery A 10 and battery B 12 are used equally. Approximately half the time that the battery power supply is in use, timer 96 commands signal generator 90 to provide control signal 92 so that battery A 10 and battery B 12, of FIGS. 1–4, are connected in series to provide a first voltage, and also so that battery B 12 provides the second voltage. Approximately the other half of the time the battery power supply is in use, timer 96 commands signal generator 90 to provide control signal 92 so that battery A 10 and battery B 12 provide the first voltage, and so that battery A 10 provides the second voltage. The scheme is based on the assumption that batteries used equally with regard to time are depleted equally.

An alternate form of battery selection similar to the timer concept provides a circuit, not shown, to command signal generator 90 to provide control signal 92 so that the battery supplying the second voltage is changed when the power is cycled. That is, when battery A 10 supplies the second voltage to an electrical device, not shown, and the power to the electrical device is interrupted, then upon reapplication of power to the electrical device the battery supplying the second voltage is changed to battery B 12. When the power to the electrical device is interrupted and reapplied again, the battery supplying the second voltage is changed back again to battery A 10.

Another form of battery selection involves a logic circuit 98, which commands signal generator 90 in response to voltage measurements made by a voltage measuring circuit 100. Measuring circuit 100 is operatively connected with a line 102 to measure the voltage at first voltage first conductor 54. Measuring circuit 100 is operatively connected with a line 104 to measure the voltage at second voltage first conductor 72. Measuring circuit 100 is operatively connected with a line 106 to measure the voltage at the second conductor of the first and second voltages 48. The voltage information collected by voltage measuring circuit 100 is communicated to logic circuit 98 by a conductive line 108. Logic circuit 98 uses the voltage information to determine to condition of the batteries. Based on the relative voltages of battery A 10 and battery B 12, the logic circuit commands signal generator 90 to provide control signal 92 so that the battery with the higher voltage is used to supply the second voltage. In this manner, the batteries are rotated so that they are depleted at an equal rate.

In an alternate embodiment of the present invention a first group of at least three batteries, or voltage subgroups, is operatively connected to supply a first voltage, the power supply also providing at least a second and third voltage supplied from subgroups of the first group that includes at least one battery, the second and third voltages being less than the first voltage. The power supply comprises a plurality of battery interconnection which are controlled by a battery interconnection controller to supply at least one voltage from different and varying subgroups of the first group. The subgroups are varied so that battery depletion is equalized. In this manner, greater differentials between voltage levels are created and additional groupings of batteries used to supply the at least three voltages are possible.

In another alternative embodiment of the present invention as illustrated in FIGS. 3 and 4, third transistor 66, fourth transistor 68, fifth transistor 74, and sixth transistor 76 are built so that the substrates of these MOSFET transistors are connected to ground creating a four terminal transistor, as is well known in the art. Since the voltage between the gate and ground generally exceeds the voltage between the gate and either the source or drain, these transistors will turn on with lower gate voltages than required for the three terminal transistor type.

Other embodiments of the present invention allow the use of other types of transistors to be used for switches. Other types of FET transistors, including p and n channel depletion mode devices, or bipolar transistors may be used in the present invention with little or no modification to the circuitry presented in FIGS. 3 and 4, as is well known in the art.

In yet another alternative embodiment of the present invention the control line 56 depicted in FIG. 4 (or control lines 56 and 62 of FIG. 3) is operatively connected to an external power on reset circuit, such as a flip-flop with a clear bar input or a microprocessor reset output pin as is well understood in the art. Such additional circuits ensure that the control signal is forced to a known voltage, that upon Startup, selects one particular battery or subgroup to provide the second voltage. For example, a ground on line 56 of FIG. 4 upon startup effects the interconnection controller so that battery B 12 supplies the second voltage. One likely use for such a startup circuit is where the interconnection controller is packaged with the electrical device, and both the controller and electrical device are powered by the power supply of the present invention. Many battery powered electrical devices are designed to be turned on and off. When the electrical device is turned on, the battery interconnection controller receives power. Upon receiving power the voltages on the control lines of FIGS. 3 and 4 are unknown. Having a default voltage on the control lines upon startup ensures that the controller selects a default subgroup of batteries to supply the voltages required by the electrical device. Once the controller and electrical device are operational, the batteries to supply the second voltage can be selected by a number of different schemes, including the ones associated with FIG. 5, mentioned above. The startup circuit is generally useful in situations where source power to the battery interconnection controller is subject to interruption, or where the battery power supply of the present invention powers the controller.

The present invention represents an improvement over prior art devices since power supply batteries are transposed either automatically, or manually by the user, to ensure uniform battery depletion. Uniform battery depletion ensures longer power supply life. Uniform battery depletion also reduces battery costs by ensuring that each battery is fully depleted when the battery power supply is fully depleted. Further, maximum and uniform depletion of batteries reduce the total number of batteries used in the long term, and thus reduces recycling costs and environmental damage. Since the battery power supply of the present invention provides a multiple voltage, long lifetime, power source, the number of voltage regulators and circuits to down convert voltage in associated electrical circuitry can be reduced yielding smaller and more efficient electrical devices. Several alternative methods of selecting, or rotating, batteries have been provided in the present invention to control the selection of the battery to supply the second voltage.

What is claimed is:

1. A battery transposition power supply to constantly supply at least two voltages having a common ground, a first voltage and a second voltage less than the first voltage, the battery transposition power supply comprising:

a first group of at least two series connected battery subgroups for supplying the first voltage, said first group of batteries including battery subgroups A and B, each having first and second terminals, the battery transposition power supply providing the second voltage from a battery subgroup of said first group including at least one battery;

a plurality of selectable battery interconnections connecting said first and second terminals of said battery subgroups for supplying the first voltage, and for selectively supplying the second voltage and common ground from different battery subgroups of said first group as follows:

when battery sub group B is selected to provide the second voltage and common ground, said battery interconnections connecting said second terminal of battery subgroup A to said first terminal of battery Subgroup B to provide the first voltage between said first terminal of battery subgroup A and said second terminal of battery subgroup B, said battery interconnections also connecting to supply the second voltage between said first and second terror-sis of battery subgroup B, wherein said second terminal of battery subgroup B is the ground common to the first and second voltages; and when battery subgroup A is selected to provide the second voltage and the common ground, said battery interconnections connecting said second terminal of battery subgroup B to said fixst terminal of battery subgroup A to provide the fixst voltage between said first terminal of battery subgroup B and said second terminal of battery subgroup A, said battery interconnections also connecting to supply the second voltage between said fixst and second terminals of battery subgroup A, wherein said second terminal of battery subgroup A is the ground common to the first and second voltages; and a battery interconnection controller operatively connected to said battery interconnections for selectively varying the subgroup from which the second voltage and common ground are derived, whereby the one or more batteries supplying the second voltage are changed to minimize differences in the depletion of the batteries.

2. A battery transposition power supply as in claim 1 in which said selectable battery interconnections are switches, and including first and second higher voltage conductors for supplying the first voltage to an external device and fixst and second lower voltage conductors for supplying the second voltage to the external device, wherein said second higher and second lower voltage conductors are the common ground, said power supply further comprising:

a first switch to selectively connect said first terminal of battery subgroup A to said first higher voltage conductor;

a second switch to selectively connect said first terminal of battery subgroup B to said first higher voltage conductor;

a third switch to selectively connect said first terminal of battery subgroup A to said second terminal of battery subgroup B;

a fourth switch to selectively connect said first terminal of battery subgroup A to said first lower voltage conductor;

a fifth switch to selectively connect said first terminal of battery subgroup B to said first lower voltage conductor;

a sixth switch to selectively connect said second terminal of battery sub group A to said first terminal of battery subgroup B;

a seventh switch to selectively connect said second terminal of battery subgroup B to said second higher and second lower voltage conductors for supplying the common ground; and an eighth switch to selectively connect said second terminal of subgroup A to said second higher and second lower voltage conductors for supplying the common ground.

3. A battery transposition power supply as in claim 2 in which said switches are operatively connected to said interconnection controller and controlled by said controller to select the subgroup to supply the second voltage as follows:

when battery sub group B is selected to supply the second voltage, said first, fifth, sixth, and seventh switches operatively connect, and said second, third, fourth, and eighth switches operatively disconnect, so that said first terminal of battery subgroup A is operatively connected to said first higher voltage conductor, said second terminal of battery sub group A is operatively connected to said first terminal of battery subgroup B and said first lower voltage conductor, and said second terminal of battery subgroup B is operatively connected to said second higher and second lower voltage conductors for supplying the common ground; and when battery subgroup A is selected to supply the second voltage, said second, third, fourth, and eighth switches operatively connect, and said first, fifth, sixth, and seventh switches operatively disconnect, so that said first terminal of battery subgroup B is operatively connected to said first higher voltage conductor, said second terminal of battery sub group B is operatively connected to said first terminal of battery subgroup A and said first lower voltage conductor, and said second terminal of battery subgroup A is operatively connected to said second higher and second lower voltage conductors for supplying the common ground.

4. A battery transposition power supply as in claim 3 in which said switches are transistors.

5. A battery transposition power supply as in claim 1 in which said selectable battery interconnections are transistors.

6. A battery transposition power supply as in claim 5 in which said transistors are controlled by changing a control signal supplied to said interconnection controller.

7. A battery transposition power supply as in claim 1 in which said battery interconnection controller includes a timer circuit to vary the selection of subgroups in a periodic manner, whereby differences in battery depletion are minimized by averaging the usage time of the battery subgroups.

8. A battery transposition power supply as in claim 1 in which said battery interconnection controller includes a voltage measuring device and a logic circuit to vary the selection of battery subgroups in response to the measurement of the first and second voltages, said logic circuit selecting primarily battery subgroups having higher voltage measurements to provide the second voltage, whereby selection of the higher voltage battery subgroups helps ensure a more uniform depletion of batteries.

9. A battery transposition power supply as in claim 1, wherein the power supply is used to selectively supply power to an external device having an on and off state, and in which said battery interconnection controller changes the battery sub group supplying the second voltage to a different battery subgroup in response to the external device change of state, whereby the battery subgroups used to supply the second voltage are varied by cycling the power to an external device.

10. A battery transposition power supply as in claim 1 including a manipulable switch, accessible to the battery supply user, to selectively operate said interconnection controller, said switch effecting the selection of the battery subgroup providing the second voltage, whereby the power supply user changes battery subgroups through manipulation of said switch.

11. A method for constantly supplying at least two different voltages with a common ground from a power supply having a plurality of transposable battery subgroups with first and second terminals, including a first voltage from a first group of batteries including battery subgroups A and B, and a second voltage being equal to a proportional fraction of the first voltage from a battery subgroup including at least one battery, and further including a plurality of battery interconnections to selectively connect battery subgroup terminals, the method comprising the following steps:

a) selectively connecting battery subgroups A and B, in series, with the battery interconnections, to provide the first voltage and a ground as follows:

when battery subgroup B is selected to provide the second voltage, the battery interconnections connect the second terminal of battery subgroup A to the first terminal of battery subgroup B to provide the first voltage between the first terminal of battery subgroup A and said second terminal of battery sub group B, wherein said second terminal of battery subgroup B is the ground; and when battery subgroup A is selected to provide the second voltage, the battery interconnections connect the second terminal of battery subgroup B to the first terminal of battery subgroup A to provide the first voltage between the first terminal of battery subgroup B and the second terminal of battery subgroup A, wherein the second terminal of battery subgroup A is the ground; and b) selectively connecting the first and second terminals of at least one battery sub group used in step a) with the battery interconnections to provide the second voltage and a ground, common to the ground in step a), as follows:

when battery subgroup B is selected to provide the second voltage, the battery interconnections connect to provide the second voltage between the first and second terminals of battery subgroup B, wherein the second terminal of battery sub group B is the ground common to the first and second voltages; and when battery subgroup A is selected to provide the second voltage, the battery interconnections connect to provide the second voltage between said first and second terminals of battery subgroup A, wherein the second terminal of battery subgroup A is the ground common to the first and second voltages, whereby the batteries are managed to augment equal usage.

12. A method as in claim 11 in which the battery interconnections between battery sub group terminals are made selectively with at least eight switches, and including a first and second higher voltage conductor to supply the first voltage to an external device, and a fixst and second lower voltage conductor to supply the second voltage to an external device, and comprising the following steps:

selectively connecting the first terminal of battery subgroup A to the fixst higher voltage conductor with switch 1;

selectively connecting the first terminal of battery subgroup B to the first higher voltage conductor with switch 2;

selectively connecting the first terminal of battery subgroup A to the second terminal of subgroup B with switch 3;

selectively connecting the fixst terminal of battery subgroup A to the fixst lower voltage conductor with switch 4;

selectively connecting the first terminal of battery subgroup B to the first lower voltage conductor with switch 5;

selectively connecting the second terminal of battery subgroup A to the first terminal of battery subgroup B with switch 6;

selectively connecting the second terminal of battery subgroup B to the second higher and second lower voltage conductors with switch 7 for supplying the common ground; and selectively connecting the second terminal of battery subgroup A to the second higher and second lower voltage conductors with switch 8 for supplying the common ground.

13. A method as in claim 12 including the step of effecting said switches to select the battery subgroup providing the second voltage as follows:

when battery subgroup B is selected to supply the second voltage, said first, fifth, sixth, and seventh switches operatively connect, and said second, third, fourth, and eighth switches operatively disconnect, so that the first terminal of battery subgroup A is operatively connected to the first higher voltage conductor, the second terminal of battery subgroup A is operatively connected to the first terminal of battery subgroup B and the first lower voltage conductor, and the second terminal of battery subgroup B is operatively connected to the second higher and second lower voltage conductors for supplying the common ground; and when battery subgroup A is selected to supply the second voltage, said second, third, fourth, and eighth switches operatively connect, and said first, fifth, sixth, and seventh switches operatively disconnect, so that the first terminal of battery subgroup B is operatively connected to the first higher voltage conductor, the second terminal of battery subgroup B is operatively connected to the first terminal of battery subgroup A and the first lower voltage conductor, and the second terminal of battery sub group A is operatively connected to the second higher and second lower voltage conductors for supplying the common ground.

14. A method as in claim 13 in which said switches are transistors.

15. A method as in claim 11 in which the steps a) and b), of selectively connecting battery subgroup terminals, are effected with transistors.

16. A method as in claim 15 including a control signal, and further including the step of controlling said transistors with the control signal.

17. A method as in claim 11 in which steps a) and b) include periodically varying the selection of battery subgroups to supply the second voltage, whereby differences in battery depletion are minimized by averaging the usage time of the batteries.

18. A method as in claim 11 including the following steps:

measuring at least one battery subgroup voltage; and varying the selection of the at least one battery subgroup in response to measurements of the at least one battery subgroup voltage in such a manner that battery subgroups having larger measured voltages are primarily used to provide the second voltage, whereby differences in battery depletion are minimized by selecting batteries with larger measured voltages.

19. A method as in claim 11, wherein the voltages are selectively supplied to an external device having an on state and an off state, and comprising the following steps:

detecting a change in the state of the external device; and changing at least one battery sub group providing the second voltage to at least one different battery subgroup in response to the detected change of state, whereby the batteries supplying the second voltage are changed when the voltage to the external device is cycled.

20. A method as in claim 11 including a manipulable, user operated, switch, and including the further step of changing the battery subgroup to provide the second voltage with the switch.

* * * * *